United States Patent
Choi et al.

(10) Patent No.: US 12,457,520 B2
(45) Date of Patent: Oct. 28, 2025

(54) METHOD OF DETERMINING OPERATION MODE FOR OPERATING PLURALITY OF LINKS WITH HUB DEVICE AND ELECTRONIC DEVICE FOR PERFORMING THE METHOD

(71) Applicant: SAMSUNG ELECTRONICS CO., LTD., Suwon-si (KR)

(72) Inventors: Hyeonu Choi, Suwon-si (KR); Junsu Choi, Suwon-si (KR); Sunghwan Kim, Suwon-si (KR); Hyunkee Min, Suwon-si (KR); Junhak Lim, Suwon-si (KR); Kiyeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 372 days.

(21) Appl. No.: 18/315,067

(22) Filed: May 10, 2023

(65) Prior Publication Data

US 2023/0300668 A1    Sep. 21, 2023

Related U.S. Application Data

(63) Continuation of application No. PCT/KR2023/002347, filed on Feb. 17, 2023.

(30) Foreign Application Priority Data

Mar. 16, 2022    (KR) .................... 10-2022-0032696

(51) Int. Cl.
    *H04W 28/02*    (2009.01)
    *H04L 1/00*    (2006.01)
(52) U.S. Cl.
    CPC ....... *H04W 28/0268* (2013.01); *H04L 1/0003* (2013.01)

(58) Field of Classification Search
    None
    See application file for complete search history.

(56) References Cited

U.S. PATENT DOCUMENTS

| 11,924,774 B2 * | 3/2024 | Kim | ...................... H04L 5/0048 |
| 12,294,984 B2 * | 5/2025 | Kandala | ................ H04W 76/15 |

(Continued)

FOREIGN PATENT DOCUMENTS

CN    112218363 A    1/2021

OTHER PUBLICATIONS

Search Report dated May 24, 2023 in corresponding International Patent Application No. PCT/KR2023/002347.

(Continued)

*Primary Examiner* — Anh Vu H Ly
(74) *Attorney, Agent, or Firm* — Nixon & Vanderhye, P.C.

(57) ABSTRACT

An electronic device is configured to determine default channel setting information on a plurality of links with at least one hub device, based on a received management frame, determine whether a first mode is usable, in which, in the first mode, data is transmitted to the at least one hub device through a first link based on the default channel setting information, and, at the same time, data is received from the at least one hub device through a second link, when the first mode is determined to be not usable, generate target channel setting information, determine whether the first mode is usable based on the target channel setting information, and, when the first mode is determined to be usable based on the target channel setting information, determine an operation mode of the plurality of links to be the first mode.

20 Claims, 14 Drawing Sheets

(56) References Cited

U.S. PATENT DOCUMENTS

| | | |
|---|---|---|
| 12,356,447 B2* | 7/2025 | Chang .................. H04W 74/08 |
| 2015/0016309 A1 | 1/2015 | Fang et al. |
| 2019/0199571 A1 | 6/2019 | John Wilson et al. |
| 2020/0383156 A1 | 12/2020 | Seok et al. |
| 2020/0404592 A1 | 12/2020 | Akkarakaran et al. |
| 2021/0014811 A1 | 1/2021 | Seok et al. |
| 2021/0076412 A1 | 3/2021 | Naribole et al. |
| 2022/0029736 A1* | 1/2022 | Chu ..................... H04L 1/0025 |
| 2022/0408367 A1* | 12/2022 | Shafin .................. H04W 76/14 |
| 2023/0155784 A1* | 5/2023 | Chang .................. H04W 76/15 370/329 |
| 2023/0164663 A1* | 5/2023 | Chang .................. H04W 40/12 370/338 |
| 2023/0189064 A1* | 6/2023 | Monajemi ........... H04W 72/542 370/329 |
| 2024/0314871 A1* | 9/2024 | Lu ........................ H04W 76/15 |

OTHER PUBLICATIONS

Aijaz, Adnan et al., "Simultaneous Transmit and Receive Operation in Next Generation IEEE 802.11 WLANs: A Mac Protocol Design Approach," arXiv: 1706.07544v1 [cs.NI], Jun. 2017, pp. 1-9.

Seok, Yongho et al., "Multi-Link Operation Management," IEEE 802.11-19/1358r5, Nov. 1, 2020, 16 pages.

Li, Yunbo et al., "CR for 9.4.2.295b.2: MLD Capabilities field," IEEE 802.11-21/1206r4, Aug. 9, 2021, 9 pages.

Song, Taewon et al., "Multi-link Management," IEEE 802.11-19/1943r8, Jul. 8, 2020, 16 pages.

* cited by examiner

METHOD OF DETERMINING OPERATION MODE FOR OPERATING PLURALITY OF LINKS WITH HUB DEVICE AND ELECTRONIC DEVICE FOR PERFORMING THE METHOD

CROSS-REFERENCE TO RELATED APPLICATIONS

This application is a continuation application of International Application No. PCT/KR2023/002347 designating the United States, filed on Feb. 17, 2022, in the Korean Intellectual Property Receiving Office and claiming priority to Korean Patent Application No. 10-2022-0032696, filed on Mar. 16, 2022, in the Korean Intellectual Property Office, the disclosures of which are incorporated by reference herein in their entireties.

BACKGROUND

1. Field

The disclosure relates to a method of determining an operation mode for operating a plurality of links between an electronic device and a hub device.

2. Description of Related Art

A wireless local area network (WLAN) may be also referred to as a wireless LAN or Wi-Fi and may refer, for example, to a system for establishing a network environment from a hub to each terminal using a wireless frequency or light instead of a wire cable in an outdoor environment or an indoor environment, which is limited to a space or a building, such as an office, a shopping center, or a house. WLAN may not need wiring and may enable easy relocation of terminals, mobile communication, and network establishment in a short time. In addition, WLAN is used for various services in various fields because WLAN enables a large amount of data to be transmitted and received with a low transmission delay.

SUMMARY

An electronic device may use a wireless local area network (WLAN) that is provided by a hub device, such as an access point (AP), to exchange data with an external device, such as a server. Recently, the hub device may provide a WLAN based on 2.4 GHz, 5 GHz, and 6 GHz frequency bands. One or more hub devices located around the electronic device may provide the electronic device with various wireless communication links based on various frequency bands. When a plurality of links is established between the electronic device and the hub device, an operation mode may need to be determined to efficiently operate the plurality of links.

An example embodiment may provide an electronic device for determining an operation mode for operating a plurality links between the electronic device and the hub device.

However, the technical aspects are not limited to the foregoing aspects, and there may be other technical aspects.

According to an example embodiment, an electronic device includes a communication module configured to exchange data with an external device and at least one processor operatively connected to the communication module and configured to control the electronic device, in which the at least one processor is configured to receive a management frame transmitted by at least one hub device using the communication module, determine default channel setting information on a plurality of links with the at least one hub device, based on the management frame, determine whether a first mode is usable, in which, in the first mode, data is transmitted to the at least one hub device through a first link based on the default channel setting information, and at the same time, data is received from the at least one hub device through a second link, when the first mode is determined to be not usable, generate first target channel setting information by changing the default channel setting information, determine whether the first mode is usable based on the first target channel setting information, and, when the first mode is determined to be usable based on the first target channel setting information, determine an operation mode of the plurality of links to be the first mode.

According to an example embodiment, a method performed by an electronic device includes receiving a management frame transmitted by at least one hub device; determining default channel setting information on a plurality of links with the at least one hub device, based on the management frame; determining whether a first mode is usable, in which, in the first mode, data is transmitted to the at least one hub device through a first link based on the default channel setting information, and. at the same time, data is received from the at least one hub device through a second link; when the first mode is determined to be not usable, generating first target channel setting information by changing the default channel setting information; determining whether the first mode is usable based on the first target channel setting information; and, when the first mode is determined to be usable based on the first target channel setting information, determining an operation mode of the plurality of links to be the first mode.

According to an example embodiment, an electronic device for determining an operation mode for operating a plurality links between the electronic device and a hub device may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
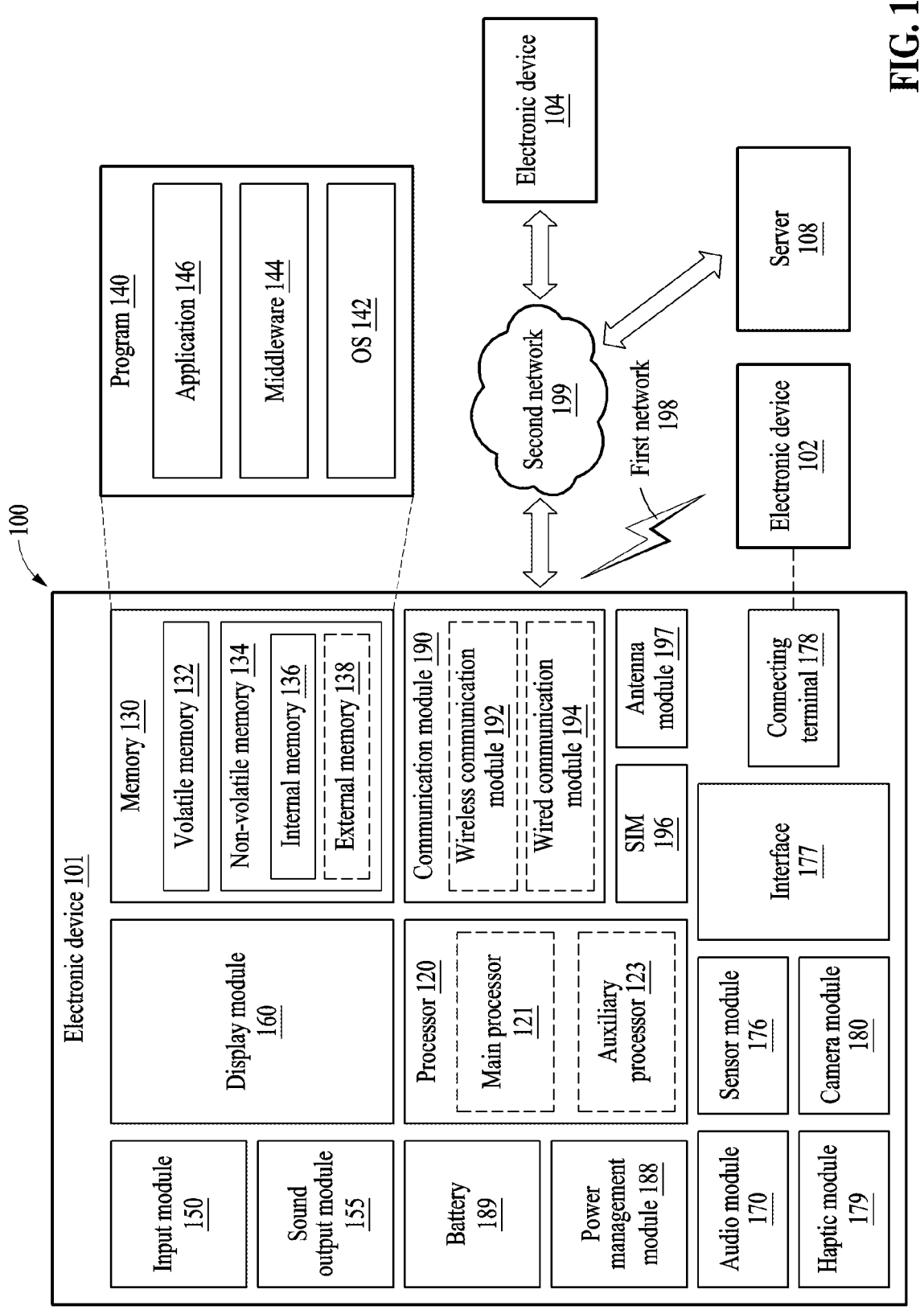
FIG. 1 is a block diagram illustrating an example electronic device in a network environment, according to an example various embodiment.

Hereinafter, embodiments will be described in detail with reference to the accompanying drawings. When describing the embodiments with reference to the accompanying drawings, like reference numerals refer to like elements and a description related thereto will not be repeated.

FIG. 1 is a block diagram illustrating an example electronic device in a network environment, according to an example embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an example embodiment, at least one (e.g., the connecting terminal 178) of the above components may be omitted from the electronic device 101, or one or more other components may be added to the electronic device 101. In an example embodiment, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal and vice versa. According to an example embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "$1^{st}$," "$2^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" storage medium may refer, for example, to a tangible device, and may not include a signal (e.g., an electromagnetic wave), but this term does not differentiate between where data is semi-permanently stored in the storage medium and where the data is temporarily stored in the storage medium.

According to an example embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to an example embodiment, each component (e.g., a module or a program) of the above-described components may include a single entity or multiple entities, and some of the multiple entities may be separately disposed in different components. According to an example embodiment, one or more of the above-described components may be omitted, or one or more other components may be added. Alternatively or additionally, a plurality of components (e.g., modules or programs) may be integrated into a single component. In such a case, according to an example embodiment, the integrated component may still perform one or more functions of each of the plurality of components in the same or similar manner as they are performed by a corresponding one of the plurality of components before the integration. According to an example embodiment, operations performed by the module, the program, or another component may be carried out sequentially, in parallel, repeatedly, or heuristically, or one or more of the operations may be executed in a different order or omitted, or one or more other operations may be added.

Figure 2:
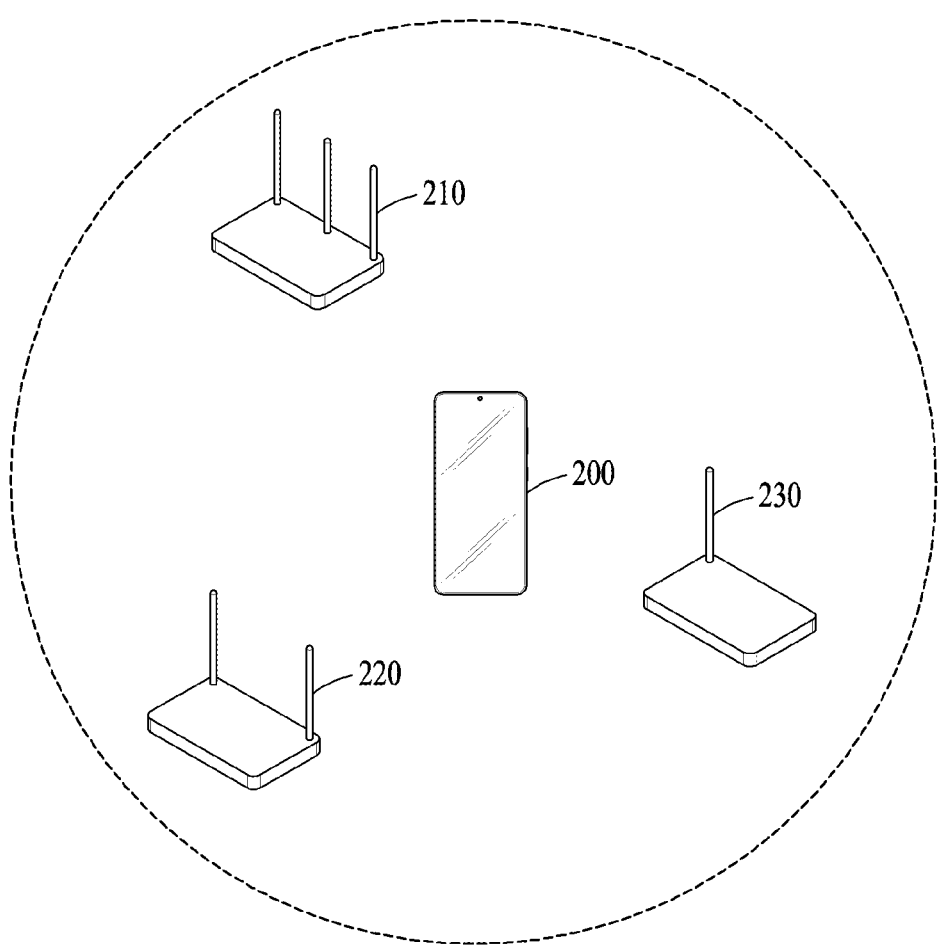
FIG. 2 is a diagram illustrating a positional relationship between an example electronic device on a plane and hub devices thereon, according to an example embodiment.

FIG. 2 is a diagram illustrating a positional relationship between an example electronic device on a plane and hub devices thereon, according to an example embodiment.

An electronic device 200 (e.g., the electronic device 101 of FIG. 1) of FIG. 2 may scan channels in frequency bands used by first, second, and third hub devices 210, 220, and 230 around the electronic device 200 and identify the first, second, and third hub devices 210, 220, and 230. The electronic device 200, using the scanned channels, may communicate with the first, second, and third hub devices 210, 220, and 230. For example, the first, second, and third hub devices 210, 220, and 230 each may be an access point (AP) or an AP multi-link device (MLD) in which a device includes a plurality of APs. In an example embodiment, the first, second, and third hub devices 210, 220, and 230 each may be a station (STA) or a non-AP MLD in which a device includes a plurality of STAs. For example, the first, second, and third hub devices 210, 220, and 230 each may be a wireless router or an electronic device (e.g., the electronic device 101 of FIG. 1) for performing an AP function. The electronic device for performing an AP function may be a soft AP device.

In an example embodiment, the first, second, and third hub devices 210, 220, and 230 each may use channels in different frequency bands, and the electronic device 200 may scan a plurality of channels to detect the first, second, and third hub devices 210, 220, and 230. For example, frequency bands used by the first, second, and third hub devices 210, 220, and 230 may include 2.4 GHz, 5 GHz, and 6 GHz bands.

According to an example embodiment, the first hub device 210 may be an AP MLD. An AP 1 of the first hub device 210 may support 2.4 GHz, an AP 2 of the first hub device 210 may support 5 GHz, and an AP 3 of the first hub device 210 may support 6 GHz. A first link (or a first channel), a second link (or a second channel), and a third link (or a third channel) may be established respectively through the AP 1, the AP 2, and the AP 3 of the first hub device 210, between the electronic device 200 and the first hub device 210. For example, an STA 1 of the electronic device 200 may establish the first link with the AP 1 of the first hub device 210, an STA 2 of the electronic device 200 may establish the second link with the AP 2 of the first hub device 210, and an STA 3 of the electronic device 200 may establish the third link with the AP 3 of the first hub device 210. For example, the first link, the second link, and the third link each may be a primary link and operate independently from the operations of one another. Controlling a plurality of links established in a hub device (e.g., the first hub device 210) may be referred to as a multi-link operation (MLO). For example, each of the links may operate independently of the operations of other links through the MLO. For example, at least some of the links may operate in synchronization with one another through the MLO. For example, a method of establishing and operating a plurality of primary links between electronic devices (e.g., the electronic device 200 and the first hub device 210) may be defined in IEEE 802.11be or Wi-Fi 7.

According to an example embodiment, the second hub device 220 may be an AP MLD. An AP 1 of the second hub device 220 may support 5 GHz and an AP 2 of the second hub device 220 may support 6 GHz. A fourth link (or a fourth channel) and a fifth link (or a fifth channel) may be established respectively through the AP 1 and the AP 2 of the second hub device 220, between the electronic device 200 and the second hub device 220. The description of the first hub device 210 may apply to the description of the second hub device 220, and the description of the second hub device 220 is not repeated.

According to an example embodiment, the third hub device 230 may be a single AP, and the AP of the third hub device 230 may support one of the 2.4 GHz, 5 GHz, and 6 GHz bands. A sixth link (or a sixth channel) may be established through the AP of the third hub device 230, between the electronic device 200 and the third hub device 230.

According to an example embodiment provided with reference to FIG. 2, the electronic device 200 may select one of the first, second, and third hub devices 210, 220, and 230 as a target hub device and exchange data with the target hub device using one or more links between the electronic device 200 and the target hub device. The electronic device 200 may exchange data with an external device through the target hub device. For example, the external device may be a server, that is, a destination of data generated by an application executed by the electronic device 200, or a server that generates data requested by the application.

According to an example embodiment, when the first hub device 210 is selected as the target hub device from among the first, second, and third hub devices 210, 220, and 230, data may be transmitted and received between the electronic device 200 and the first hub device 210. For example, the electronic device 200 may transmit data to the first hub device 210 through the first link among the links connected to the first hub device 210 and receive data from the first hub device 210 through the second link among the links connected to the first hub device 210.

The first link and the second link may operate in the MLO. When signal interference does not occur between the data transmission through the first link and the data reception through the second link, the data transmission and the data reception may be performed simultaneously. For example, when a frequency interval between channels in the first link and channels in the second link is sufficient, signal interference may not occur between the data transmission and the data reception. For example, a mode in which data transmission and data reception are performed simultaneously may be referred to as a simultaneous transmission and reception (STR) mode.

Although the first link and the second link may operate in the MLO, the data transmission through the first link and the data reception through the second link may not be performed simultaneously when signal interference occurs between the data transmission and the data reception. For example, when a frequency interval between the channels in the first link and the channels in the second link is insufficient, signal interference may occur between the data transmission and the data reception. For example, a mode in which the data transmission and the data reception are not performed simultaneously may be referred to as a non-simultaneous transmission and reception (NSTR) mode.

Signal interference between data transmission and data reception is described in detail below with reference to FIG. 5, and a method of determining an operation mode for exchanging data between an electronic device (e.g., the electronic device 200) and a hub device (e.g., the first hub device 210) is described in detail below with reference to FIGS. 6, 7, 8, 9, 10, 11, and 12.

Figure 3A:
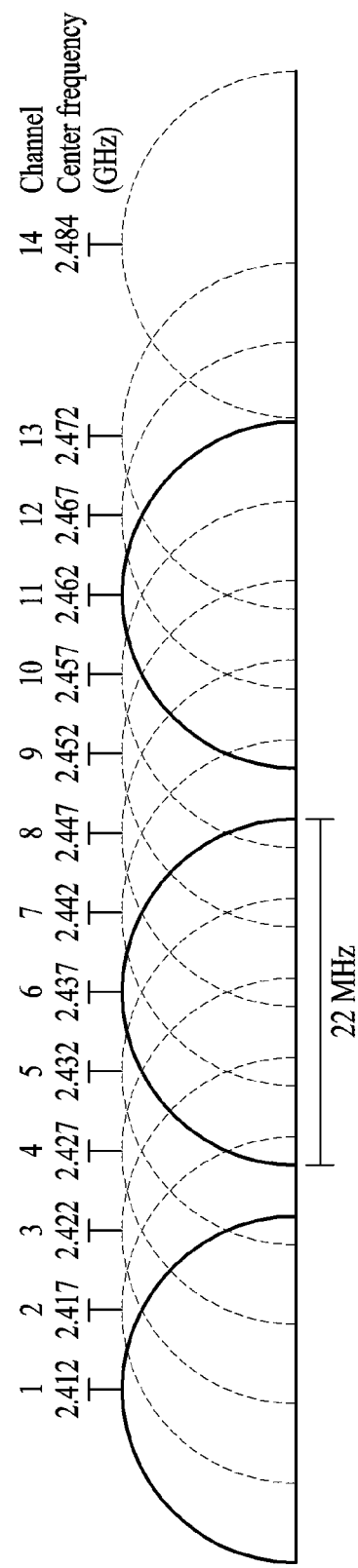
FIG. 3A is a diagram illustrating channels in a 2.4 GHz band, according to an example embodiment.

FIG. 3A is a diagram illustrating channels in a 2.4 GHz band, according to an example embodiment.

According to an example embodiment, 14 channels may be allocated to the 2.4 GHz band. Each of the channels in the 2.4 GHz band may have a 22 MHz bandwidth based on the center frequency of each of the channels. For example, channel 1 in the 2.4 GHz band may have a 22 MHz bandwidth with the center frequency of channel 1 being 2.412 MHz.

Active scanning may be performed on the channels in the 2.4 GHz band. The active scanning may include an electronic device propagating a probe request around the electronic device and the electronic device waiting to receive a probe response to the probe request.

Figure 3B:
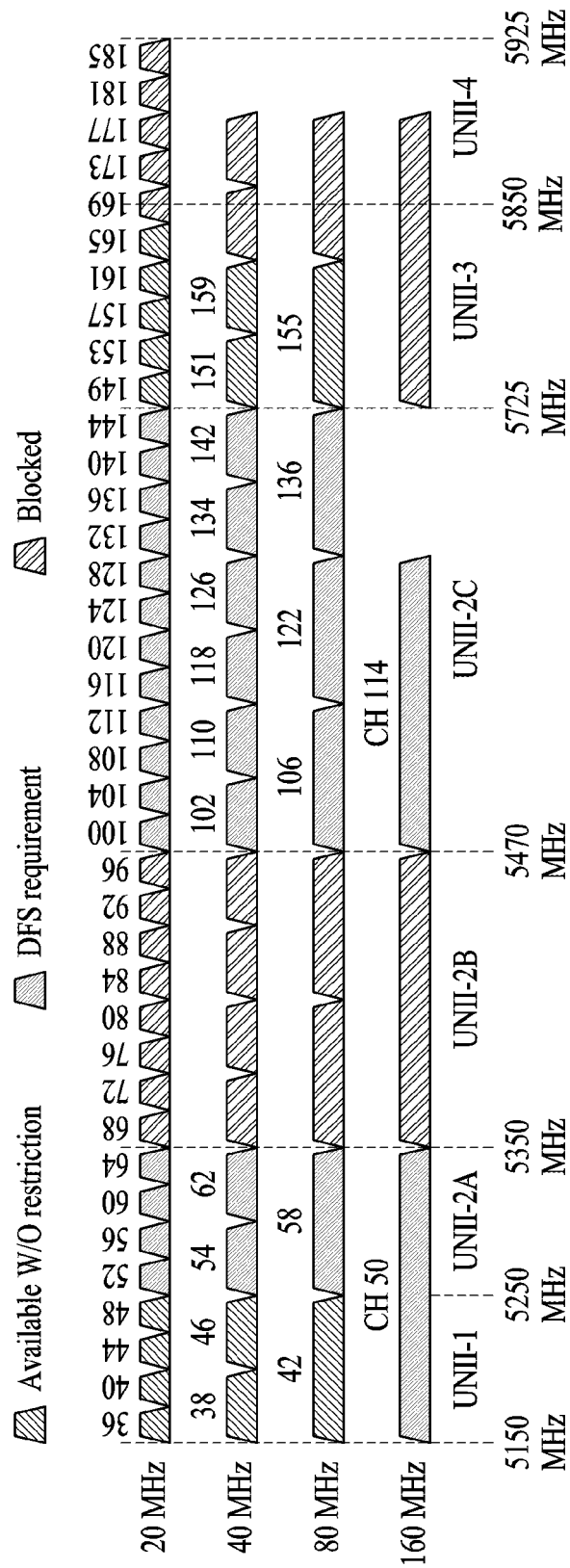
FIG. 3B is a diagram illustrating channels in a 5 GHz band, according to an example embodiment.

FIG. 3B is a diagram illustrating channels in a 5 GHz band, according to an example embodiment.

According to an example embodiment, channels with 20 MHz, 40 MHz, 80 MHz, and 160 MHz bandwidths may be allocated to the 5 GHz band. The channels may be classified according to the purpose of use. For example, the channels may be a channel available without restriction, a channel requiring dynamic frequency selection (DFS), and a blocked channel. The DFS-requiring channel may be a channel not available for the purpose of general communication when the channel is used for a designated purpose, such as a military radar, satellite communication, or a weather radar, and may be a channel available for the purpose of general communication when it is verified that the channel is not used for the designated purpose.

In the 5 GHz band, active scanning may be performed on channels 36, 40, 44, 48, 149, 153, 157, 161, and 165, which are WLAN channels, and passive scanning may be performed on channels 52, 56, 60, 64, 100, 104, 108, 112, 116, 120, 124, 128, 132, 136, 140, and 144, which are DFS channels. The passive scanning may include an electronic device not propagating a probe request and an electronic device waiting to receive a beacon signal transmitted from a hub device.

Figure 3C:
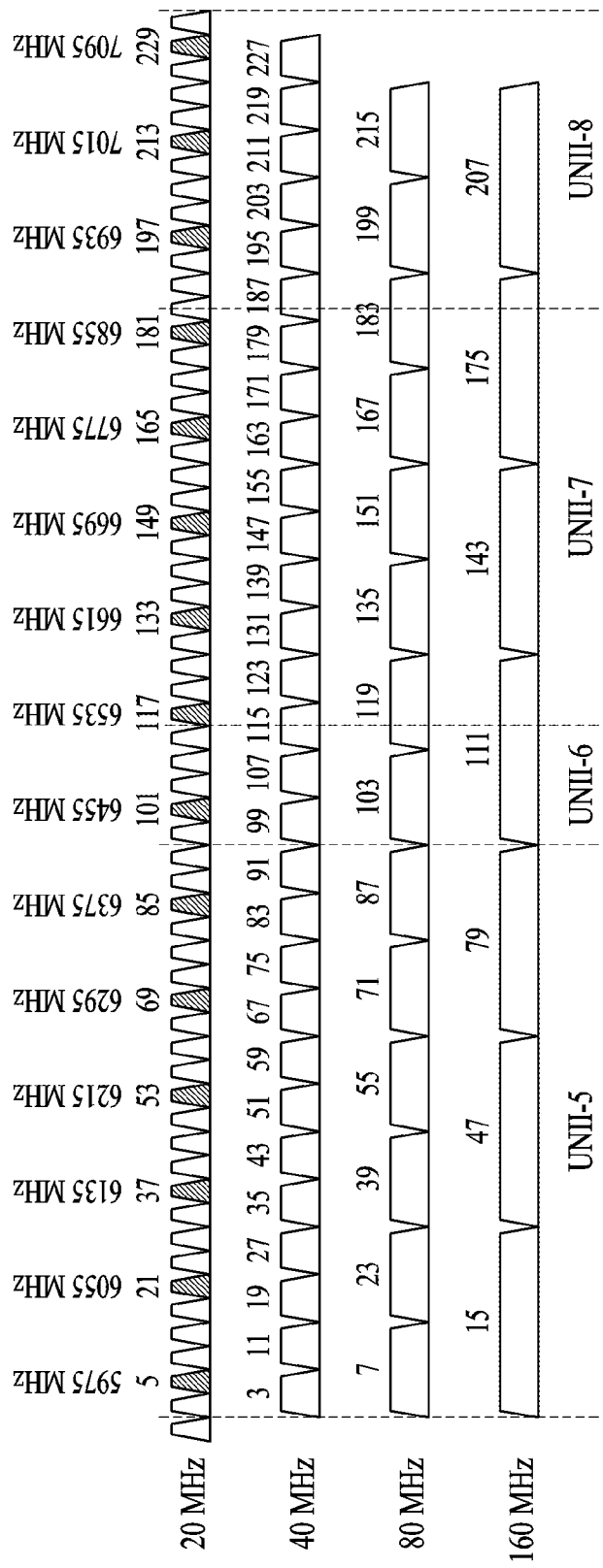
FIG. 3C is a diagram illustrating channels in a 6 GHz band, according to an example embodiment.

FIG. 3C is a diagram illustrating channels in a 6 GHz band, according to an example embodiment.

According to an example embodiment, channels with 20 MHz, 40 MHz, 80 MHz, and 160 MHz bandwidths may be allocated to the 6 GHz band. For example, the 6 GHz band may include some (e.g., a band after 5925 MHz) of 5 GHz and some (e.g., a band before 7125 MHz) of 7 GHz.

The channels with the 20 MHz bandwidth may be classified into a preferred scanning channel (PSC) or a non-PSC. The PSC may be a set of fifteen 20 MHz channels spaced apart from one another at an 80 MHz interval. For example, a hub device (e.g., the first, second, and third hub devices 210, 220, and 230 of FIG. 2) may match a default channel to the PSC such that the electronic device 200 may easily detect a channel. For example, the PSC may include channels 5, 21, 37, 53, 69, 85, 101, 117, 133, 149, 165, 181, 197, 213, and 229. The rest of the channels excluding the PSC may be a non-PSC.

Active scanning may be performed on the channels in the 6 GHz band.

Figure 4:
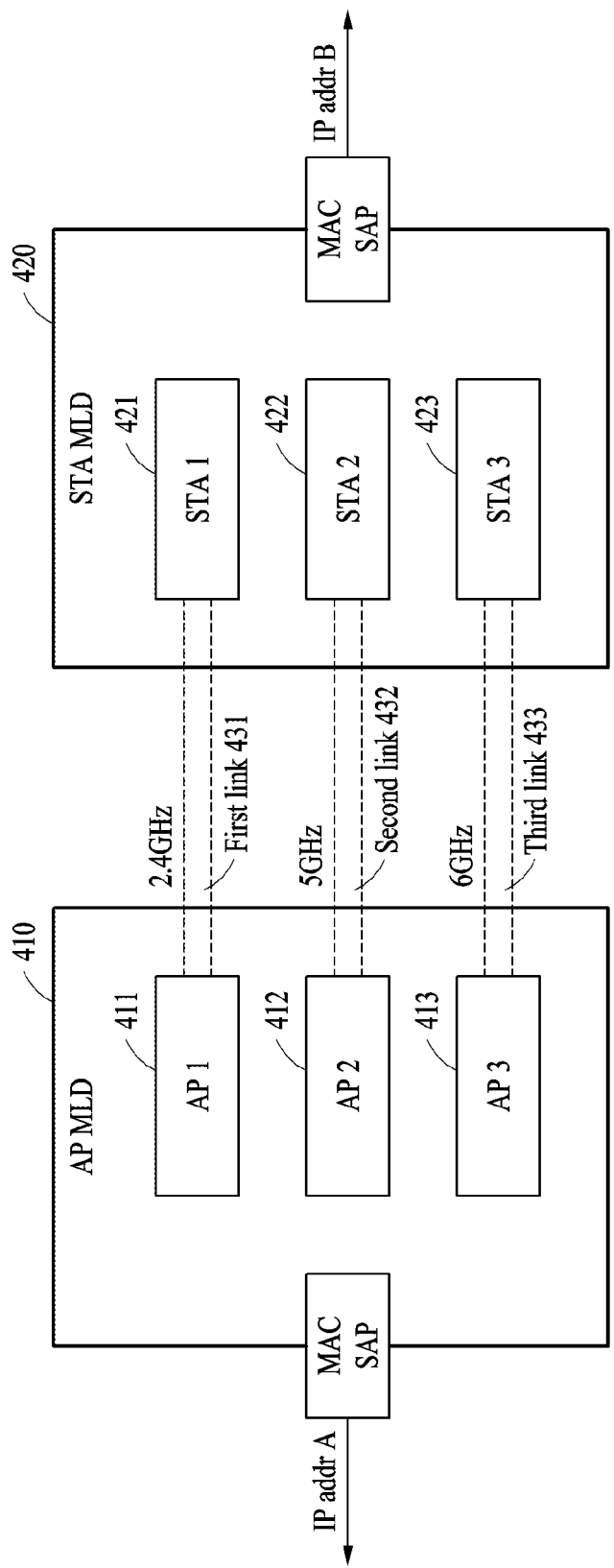
FIG. 4 is a diagram illustrating a plurality of wireless communication links established between an example electronic device and an example hub device, according to an example embodiment.

FIG. 4 is a diagram illustrating a plurality of wireless communication links established between an example electronic device and an example hub device, according to an example embodiment.

According to an example embodiment, wireless communication links including a first link 431, a second link 432, and a third link 433 may be established between an STA MLD 420 (e.g., the electronic device 101 of FIG. 1 or the electronic device 200 of FIG. 2) and an AP MLD 410 (e.g., the first hub device 210 or the second hub device 220 of FIG. 2).

The AP MLD 410 may include an AP 1 411, an AP 2 412, and an AP 3 413, media access control (MAC) addresses of the AP MLD 410, the AP 1 411, the AP 2 412, and the AP 3 413 may be different from one another, and the MAC address of the AP MLD 410 may be a representative MAC address. For example, the AP 1 411 in the AP MLD 410 may support 2.4 GHz, the AP 2 412 in the AP MLD 410 may support 5 GHz, and the AP 3 413 in the AP MLD 410 may support 6 GHz, but examples are not limited thereto. For example, the AP MLD 410 may have A as an Internet Protocol (IP) address.

The STA MLD 420 may include an STA 1 421, an STA 2 422, and an STA 3 423, MAC addresses of the STA MLD 420, the STA 1 421, the STA 2 422, and the STA 3 423 may be different from one another, and the MAC address of the STA MLD 420 may be a representative MAC address. For example, the STA 1 421 in the STA MLD 420 may support 2.4 GHz, the STA 2 422 in the STA MLD 420 may support 5 GHz, and the STA 3 423 in the STA MLD 420 may support 6 GHz, but examples are not limited thereto. For example, the STA MLD 420 may have B as an IP address.

The APs in the AP MLD 410 and the STAs in the STA MLD 420 may be physically configured as devices or logically configured.

Figure 5:
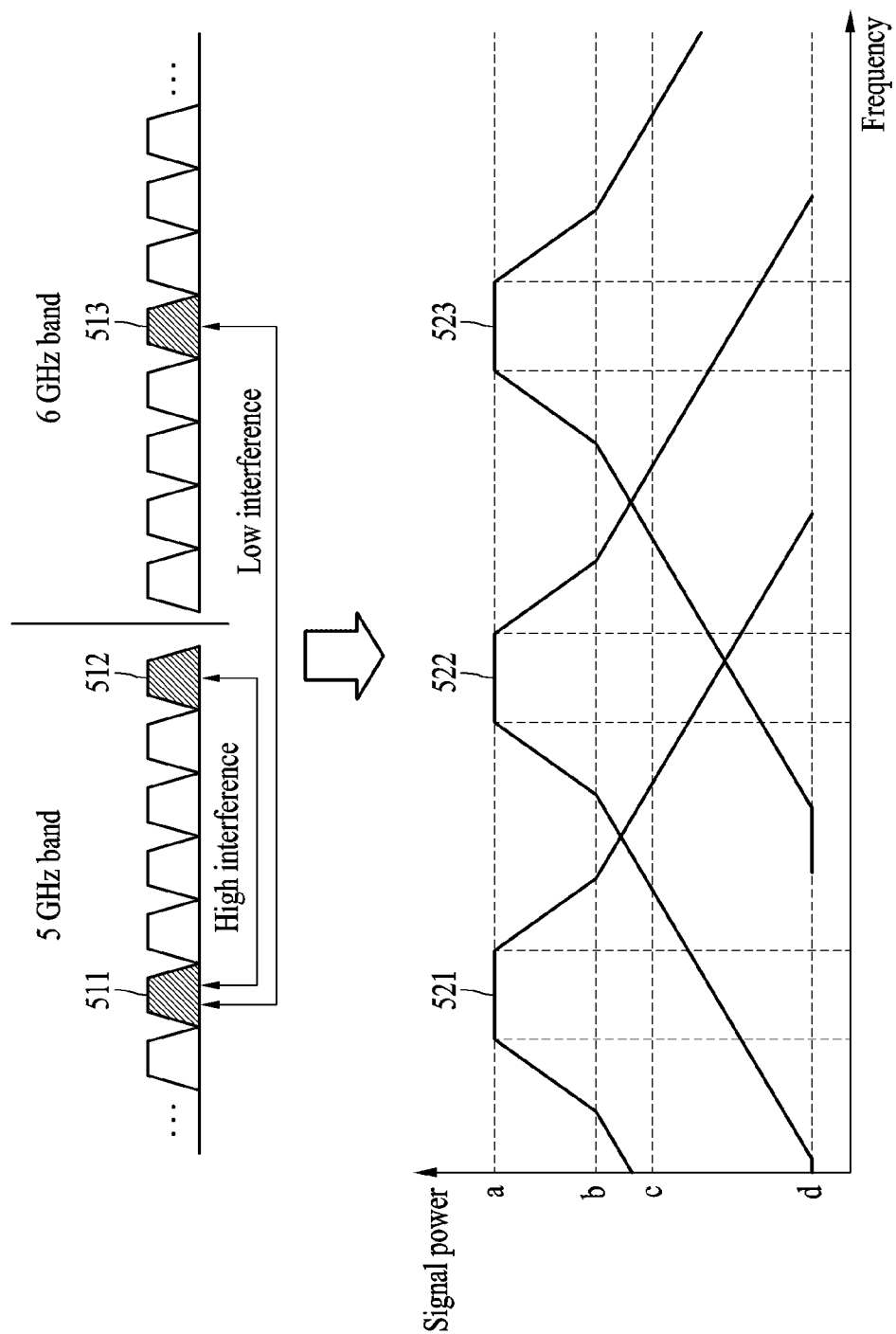
FIG. 5 is a diagram illustrating signal interference between two operation channels, according to an example embodiment.

FIG. 5 is a diagram illustrating signal interference between two operation channels, according to an example embodiment.

According to an example embodiment, two links may be established between an electronic device (e.g., the electronic device 101 of FIG. 1 or the electronic device 200 of FIG. 2) and a hub device (e.g., the first hub device 210 of FIG. 1).

For example, the two links may include a first link and a second link. The first link and the second link may each be used as a downlink or an uplink. Hereinafter, an example of the first link being used as a downlink and the second link being used as an uplink is described, and the description of the example may similarly apply to an example of the first link and the second link both being used as an uplink and an example of the first link and the second link both being used as a downlink.

For example, the first link may include channel 511 in a 5 GHz band and the second link may include channel 512 in the 5 GHz band. The power of a downlink signal using channel 511 may be represented by a graph 521 and the power of an uplink signal using channel 512 may be represented by a graph 522. When a frequency interval between channel 511 and channel 512 is insufficient (for example, when the first link and the second link overlap with each other in signal power b to c sections), the downlink signal may interfere with the uplink signal and the uplink signal may interfere with the downlink signal. When interference between signals is high, the signals may not be transmitted or received by simultaneously using channel 511 and channel 512.

For example, the first link may include channel 511 in the 5 GHz band and the second link may include channel 513 in a 6 GHz band. Channel 513 may be a channel of a higher frequency than that of channel 512. The power of the downlink signal using channel 511 may be represented by the graph 521 and the power of an uplink signal using channel 513 may be represented by a graph 523. When a frequency interval between channel 511 and channel 513 is sufficient (for example, when the first link and the second link overlap with each other in a section less than or equal to the signal power c section), the downlink signal may not interfere with the uplink signal and the uplink signal may not interfere with the downlink signal. When interference between signals does not exist or is low, the signals may be transmitted and received by simultaneously using channel 511 and channel 513.

As described in the examples above, an operation mode of the electronic device and the hub device may be determined to be an STR mode or an NSTR mode based on a frequency interval between a channel of the first link and a channel of the second link.

According to an example embodiment, although the electronic device and the hub device may operate in the NSTR mode according to default setting values (e.g., signal transmission power, a bandwidth of a link, and/or an MCS value) for data transmission and reception between the electronic device and the hub device, the electronic device and the hub device may operate in the STR mode by changing at least some of the default setting values according to an electric field situation between the electronic device and the hub device.

A method, performed by the electronic device, of determining an operation mode of a plurality of operation links is described in detail below with reference to FIGS. 6, 7, 8, 9, 10, 11, and 12.

Figure 6:
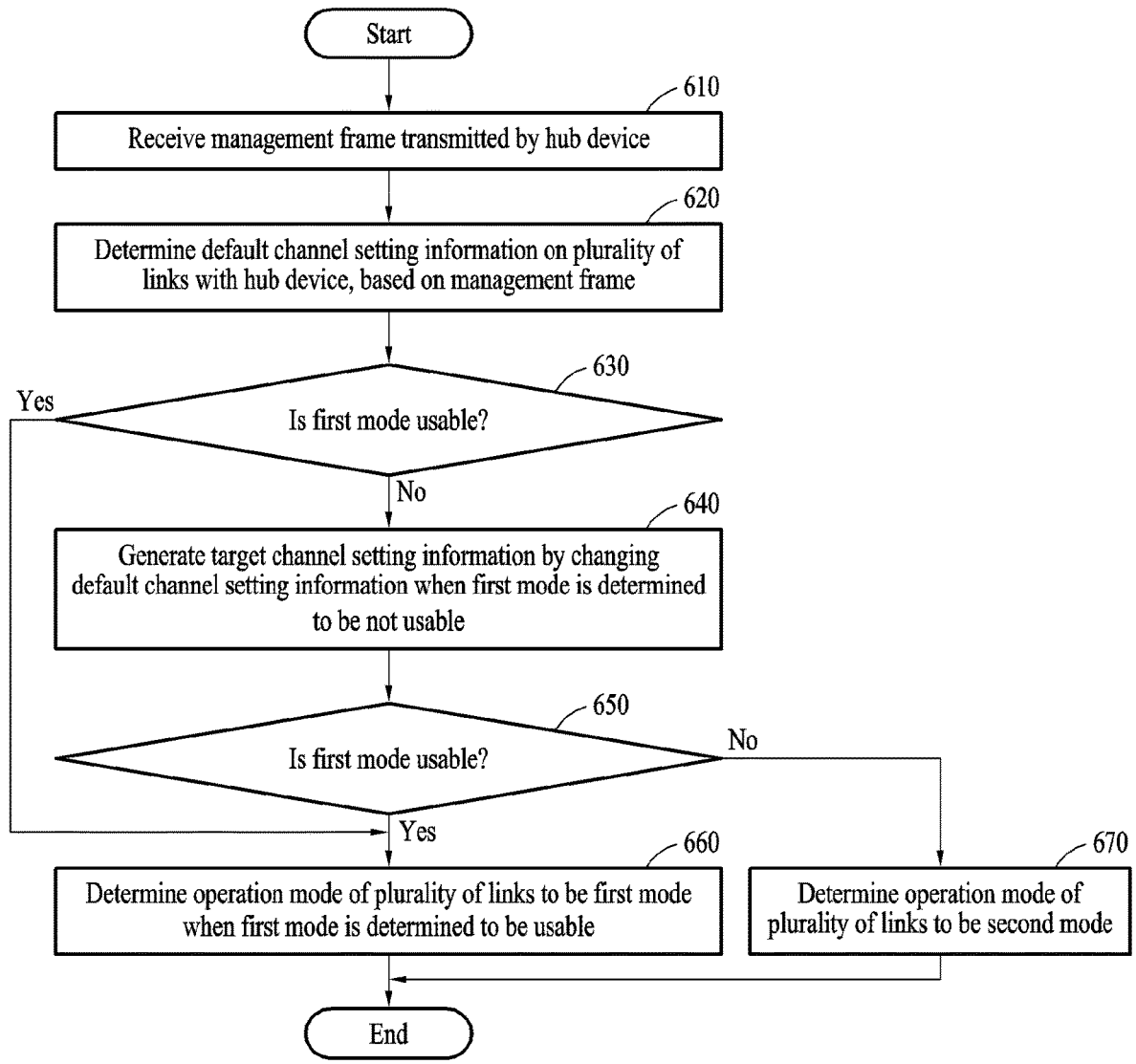
FIG. 6 is a flowchart illustrating an example method of determining an operation mode of a plurality of operation links, according to an example embodiment.

FIG. 6 is a flowchart illustrating an example method of determining an operation mode of a plurality of operation links, according to an example embodiment.

According to an example embodiment, operations 610 to 670 may be performed by an electronic device (e.g., the electronic device 101 of FIG. 1, the electronic device 200 of FIG. 2, or the STA MLD 420). The electronic device may include a communication module (e.g., the communication module 190 of FIG. 1) (e.g., including communication circuitry) and a processor (e.g., the processor 120 of FIG. 1) (e.g., including processing circuitry). For example, the electronic device may be one of a mobile communication terminal, a laptop, a personal computer (PC), a tablet terminal, or a wearable device.

In operation 610, the processor of the electronic device, using the communication module, may receive a management frame that is transmitted by at least one hub device (e.g., the first, second, and third hub devices 210, 220, and 230 of FIG. 2 or the AP MLD 410 of FIG. 4). For example, when the at least one hub device is an AP MLD, the processor of the electronic device may receive, from the AP MLD, each management frame of a plurality of links. For example, the plurality of links may be links for different frequency bands (e.g., a 2.4 GHz band, a 5 GHz band, and a 6 GHz band).

According to an example embodiment, the electronic device and the hub device may establish the plurality of links (e.g., two or more links among the first link 431, the second link 432, and the third link 433 of FIG. 4) based on the management frames. For example, the electronic device may receive a beacon, as a management frame, that is transmitted by the hub device and transmit a probe request based on the received beacon, to the hub device. For example, the electronic device may receive a probe response, as a management frame, that is transmitted by the hub device and transmit an authentication request based on the received probe response, to the hub device. For example, the electronic device may receive an authentication response, as a management frame, that is transmitted by the hub device and transmit an association request based on the received authentication response, to the hub device. For example, the electronic device may receive an association response, as a management frame, that is transmitted by the hub device and transmit a robust security network association (RSNA) response based on the received association response, to the hub device. The electronic device may receive an RSNA response, as a management frame, that is transmitted by the hub device.

According to an example embodiment, the electronic device may transmit, to the hub device, information on a medium access method desired by the electronic device in a process of establishing the plurality of links. For example, the electronic device may transmit the information on a medium access method desired by the electronic device through an MLD capabilities subfield represented by Table 1 and an STA control field represented by Table 2 below. The MLD capabilities subfield or the STA control field may be included in a response frame that is transmitted by the electronic device to the hub device.

TABLE 1

| MLD capabilities subfield | | | | |
|---|---|---|---|---|
| Maximum number of simultaneous links | SRS support | TID-to-link mapping negotiation supported | Frequency separation for STR | Reserved |
| 4 bits | 1 bit | 2 bits | 5 bits | 4 bits |

TABLE 2

| | | | STA control field | | | | |
|---|---|---|---|---|---|---|---|
| Link ID | Complete profile | MAC address present | Beacon interval present | DTIM info present | NSTR link pair present | NSTR bitmap size | Reserved |
| 4 bits | 1 bit | 1 bit | 1 bit | 1 bit | 1 bit | 1 bit | 6 bits |

For example, when the maximum number of simultaneous links is 1 and the NSTR link pair present is 0, the electronic device may use two links in an STR mode.

For example, when the maximum number of simultaneous links is 1 and the NSTR link pair present is 1, the electronic device may use two links in an NSTR mode.

According to an example embodiment, after establishing the plurality of links with the hub device, the electronic device may update the information on a medium access method desired by the electronic device, based on the management frames.

According to an example embodiment, the electronic device may provide the hub device with a minimum frequency interval between links needed at least to use the STR mode through the frequency separation for STR of the MLD capabilities subfield by the electronic device. The hub device may determine, based on the provided minimum frequency interval between the links, channels used to establish the links with the electronic device such that the electronic device may use the STR mode. Based on the channels determined by the hub device, the plurality of links may be established between the electronic device and the hub device.

According to an example embodiment, the minimum frequency interval may be preset based on the physical property of a hardware element (e.g., an antenna element) of the electronic device. For example, the minimum frequency interval may be preset based on a physical distance between an antenna element (e.g., the STA 2 422 of FIG. 4) used for a first link and an antenna element (e.g., the STA 3 423 of FIG. 4) used for a second link.

In operation 620, the processor of the electronic device may determine default channel setting information on the plurality of links with the hub device, based on the management frames.

According to an example embodiment, the default channel setting information may include at least one of information on the default transmission power of a wireless signal of data that is exchanged between the electronic device and the hub device, default bandwidth information on a first bandwidth of the first link (e.g., an uplink or a downlink) and a second bandwidth of the second link (e.g., a downlink or an uplink) among the plurality of links, or information on a default MCS on the wireless signal. For example, each value included in the default channel setting information may be a default value preset by a manufacturer or a user of the electronic device. For example, each value included in the default channel setting information may be a default value preset such that the default value may correspond to a communication protocol (e.g., a communication standard).

In operation 630, based on the default channel setting information, the processor of the electronic device may determine whether a first mode (e.g., the STR mode) is usable, in which data may be transmitted and received simultaneously to and from the hub device through the first link and the second link among the plurality of links.

According to an example embodiment, using the default transmission power, the default bandwidth, and the default MCS, the electronic device may determine that the first mode is usable when determining that the transmission of uplink data and the reception of downlink data are performed simultaneously. For example, the electronic device may determine that the first mode is usable when a difference between the frequency band of the first link and the frequency band of the second link is greater than or equal to a default minimum frequency interval determined based on the default channel setting information. For example, the electronic device may determine that the first mode is usable when interference between a wireless signal of the uplink data and a wireless signal of the downlink data, based on the default channel setting information, is less than or equal to a preset interference level.

When the difference between the frequency band of the first link and the frequency band of the second link is not set to be greater than or equal to the minimum frequency interval, the electronic device may use a second mode (e.g., the NSTR mode) in a network environment in which the first mode (e.g., the STR mode) is usable, and an advantageous effect of an MLO may decrease. When an interval between minimum frequencies requested by multiple electronic devices is excessive, the hub device may have a limited frequency range that is selectable when determining an operation channel of each link to configure the first mode. For example, when the multiple electronic devices request a 480 MHz minimum frequency interval, the hub device may not use a 480 MHz band that is between the 5 GHz band and the 6 GHz band to configure (for example, allocate a channel of each link) a network such that the first mode may be used by the multiple electronic devices.

According to an example embodiment, a method may be considered, in which the electronic device generates target channel setting information by changing the default channel setting information and uses the first mode based on the target channel setting information even when an interval between the channels of the links, which are allocated by the hub device, with the multiple electronic devices does not satisfy the default minimum frequency interval determined based on the default channel setting information. Hereinafter, a method of determining, based on the target channel setting information, whether the first mode is usable in the electronic device through operations 640 and 650 is described in detail.

According to an example embodiment, operation 660 to be described below may be performed when the first mode is determined to be usable in operation 630, and operation 640 may be performed when the first mode is determined to be not usable in operation 630.

In operation 640, when the first mode is determined to be not usable based on the default channel setting information, the electronic device may generate the target channel setting information by changing the default channel setting information.

According to an example embodiment, the electronic device may generate the target channel setting information by changing at least one of the default setting values (e.g., the signal transmission power, the bandwidth of a link, and/or the MCS value) of the default channel setting information.

For example, the electronic device may generate the target channel setting information by changing one of the default setting values. An example of changing the signal transmission power is described in detail below with reference to FIGS. 7 and 8. An example of changing the bandwidth of a link is described in detail below with reference to FIGS. 9 and 10. An example of changing the MCS value is described in detail below with reference to FIG. 11.

For example, the electronic device may generate the target channel setting information by changing two or more of the default setting values. By changing two or more of the default setting values, a combination of optimal setting values for using the first mode may be determined. The method of changing two or more of the default setting values may be a method of a combination of the examples of changing channel setting information described with reference to FIGS. 7, 8, 9, 10, and 11, but examples are not limited thereto.

According to an example embodiment, a target minimum frequency interval determined based on the target channel setting information may be less than a default minimum frequency interval determined based on the default channel setting information. As the minimum frequency interval decreases, the possibility of using the first mode by the electronic device may increase even in the same network environment.

In operation 650, the electronic device may determine whether the first mode is usable, based on the target channel setting information.

According to an example embodiment, by using a value to which at least one of the default transmission power, the default bandwidth, and the default MCS is changed, the electronic device may determine that the first mode is usable when determining that the transmission of uplink data and the reception of downlink data are performed simultaneously. For example, the electronic device may determine that the first mode is usable when the difference between the frequency band of the first link and the frequency band of the second link is greater than or equal to the target minimum frequency interval determined based on the target channel setting information. For example, the electronic device may determine that the first mode is usable when interference between a wireless signal of the uplink data and a wireless signal of the downlink data, based on the target channel setting information, is less than or equal to a preset interference level.

According to an example embodiment, operation 660 to be described below may be performed when the first mode is determined to be usable in operation 650, and operation 640 may be repeatedly performed or operation 670 to be described below may be performed when the first mode is determined to be not usable in operation 650.

According to an example embodiment, the electronic device may repeatedly perform operations 640 and 650 up to a preset number of times and may perform operation 670 when determining, based on regenerated (or modified) target channel setting information, that the first mode is still not usable. For example, the processor of the electronic device may determine whether the STR mode is usable, based on the target channel setting information, generate second target channel setting information by changing the target channel setting information when the STR mode is determined to be not usable, and determine whether the STR mode is usable, based on the second target channel setting information. In operation 660, the processor of the electronic device may determine, to be the first mode, an operation mode of the first link and the second link among the plurality of links with the hub device when the first mode is determined to be usable.

According to an example embodiment, the electronic device may transmit and receive data simultaneously to and from the hub device through the first link and the second link that are operating in the first mode. For example, the electronic device may transmit uplink data to the hub device through the first link, and at the same time, receive downlink data from the hub device through the second link. At least some of a time of receiving the downlink data by the electronic device and a time of transmitting the uplink data by the electronic device may overlap with each other.

According to an example embodiment, the electronic device may notify that the electronic device may operate in the first mode by transmitting the target channel setting information to the hub device. The hub device may transmit and receive data in the first mode to and from the electronic device, based on the target channel setting information.

In operation 670, the processor of the electronic device may determine the operation mode of the plurality of links to the second mode (e.g., the NSTR mode) when the first mode is determined to be not usable.

Figure 7:
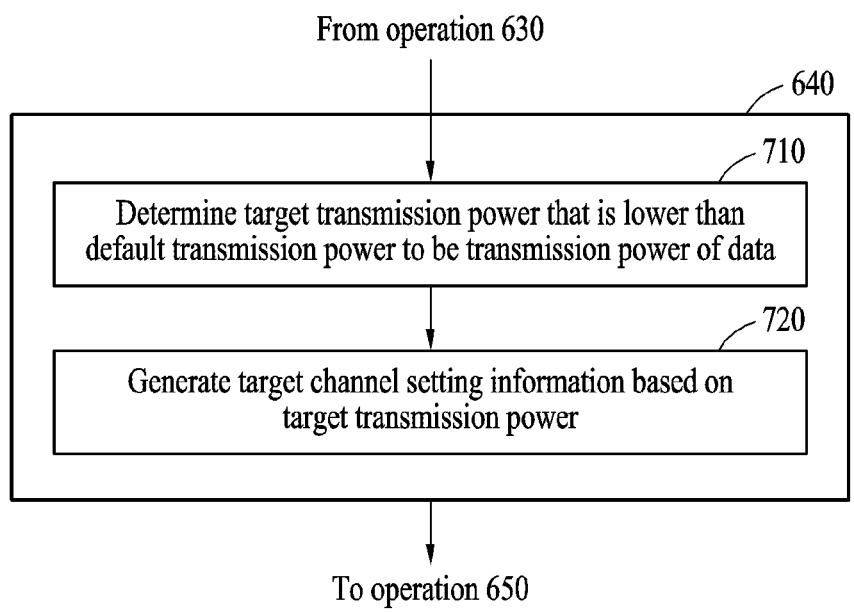
FIG. 7 is a flowchart illustrating an example method of generating target channel setting information based on transmission power of a wireless signal of data, according to an example embodiment.

FIG. 7 is a flowchart illustrating an example method of generating target channel setting information based on transmission power of a wireless signal of data, according to an example embodiment.

According to an example embodiment, operation 640 described above with reference to FIG. 6 may include operations 710 and 720. Operations 710 and 720 may be performed by an electronic device (e.g., the electronic device 101 of FIG. 1, the electronic device 200 of FIG. 2, or the STA MLD 420 of FIG. 4).

In operation 710, a processor of the electronic device may determine target transmission power that is lower than default transmission power to be the transmission power of a wireless signal of data. For example, the target transmission power may be between the default transmission power and lowest possible transmission power which enables wireless communication between the electronic device and a hub device (e.g., the first, second, and third hub devices 210, 220, and 230 of FIG. 2 or the AP MLD 410 of FIG. 4). The wireless signal of data may be a wireless signal of uplink data and/or a wireless signal of downlink data. The feature of a wireless signal transmitted with the target transmission power is described in detail below with reference to FIG. 8.

According to an example embodiment, the electronic device may determine the target transmission power based on a reception intensity of a management frame received from the hub device. For example, as the hub device gets closer to the electronic device, the target transmission power may decrease.

In operation 720, the processor of the electronic device may generate target channel setting information based on the target transmission power. The target channel setting information may include information on the target transmission power. For example, the target channel setting information may further include default bandwidth information and default MCS information. For example, the target channel setting information may further include target bandwidth information changed from the default bandwidth information and/or target MCS information changed from the default MCS information.

According to an example embodiment, a target minimum frequency interval determined based on the target channel setting information may be less than a default minimum frequency interval determined based on the default channel setting information. For example, when a difference between a frequency band of a first link and a frequency band of a second link is greater than the minimum frequency interval, the electronic device may determine that a first mode is usable (e.g., operation 650).

According to an example embodiment, the electronic device may transmit information on a decreased minimum frequency interval to the hub device by displaying the information on the decreased minimum frequency interval on the frequency separation for STR of the MLD capabilities subfield of Table 1.

Figure 8:
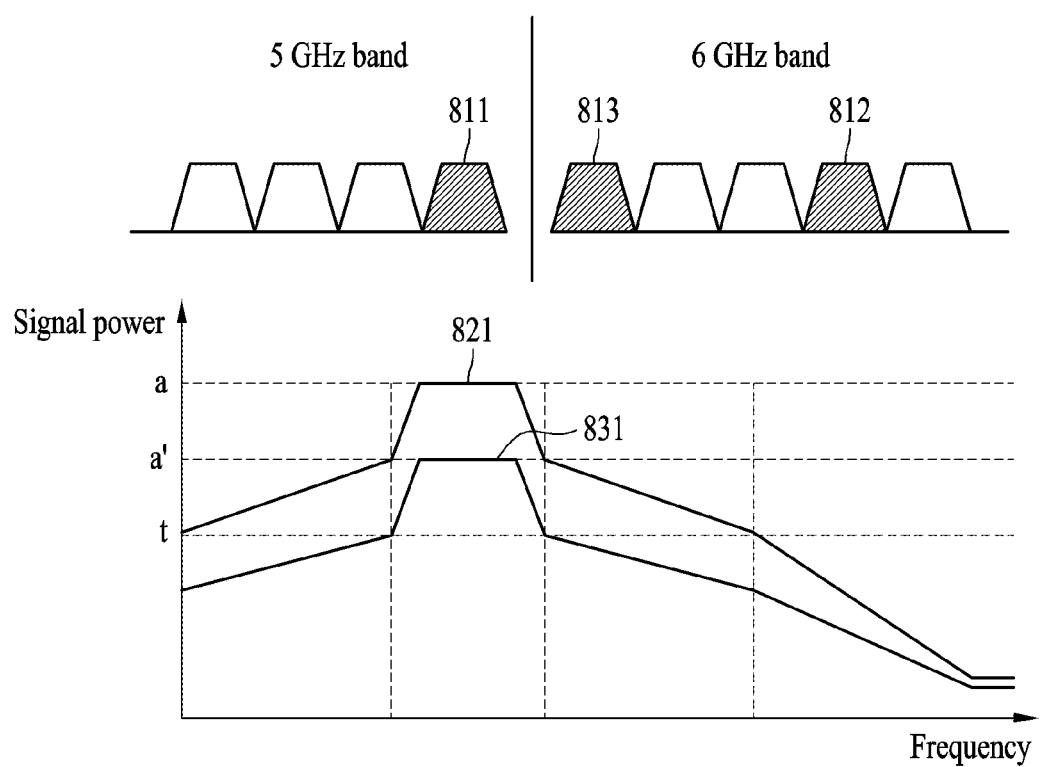
FIG. 8 is a diagram illustrating a minimum frequency interval varying depending on transmission power of a wireless signal of data, according to an example embodiment.

FIG. 8 is a diagram illustrating a minimum frequency interval varying depending on transmission power of a wireless signal of data, according to an example embodiment.

According to an example embodiment, a first channel 811 may be allocated to a first link. For example, the first channel 811 may be the last available channel of a 5 GHz frequency band.

When the wireless signal of data is transmitted with default transmission power a through the first channel 811, the feature of the wireless signal may be represented by a graph 821. For example, when threshold power t is set, which may have a small impact on interference between wireless signals, interference may not occur between a wireless signal of the first link and a wireless signal of the second link when a second channel 812 may be allocated to a second link.

Unlike the example above, when the wireless signal of data is transmitted with default transmission power a' through the first channel 811, the feature of the wireless signal may be represented by a graph 831. For example, when the threshold power t is set, which may have a small impact on interference between wireless signals, interference may not occur between the wireless signal of the first link and the wireless signal of the second link even when a third channel 813, of which the frequency band is lower than that of the second channel 812, is allocated to the second link. A minimum frequency interval required to prevent interference between links may decrease by decreasing transmission power of the transmitted wireless signal.

According to an example embodiment, an interference level with different transmission power may be predetermined for each channel in a 2.4 GHz band, the 5 GHz band, and a 6 GHz band. For example, channels that do not interfere with the first channel 811 with transmission power a may be predetermined to be upper channels of the second channel 812, and channels that do not interfere with the first channel 811 with transmission power a' may be predetermined to be upper channels of the third channel 813.

Figure 9:
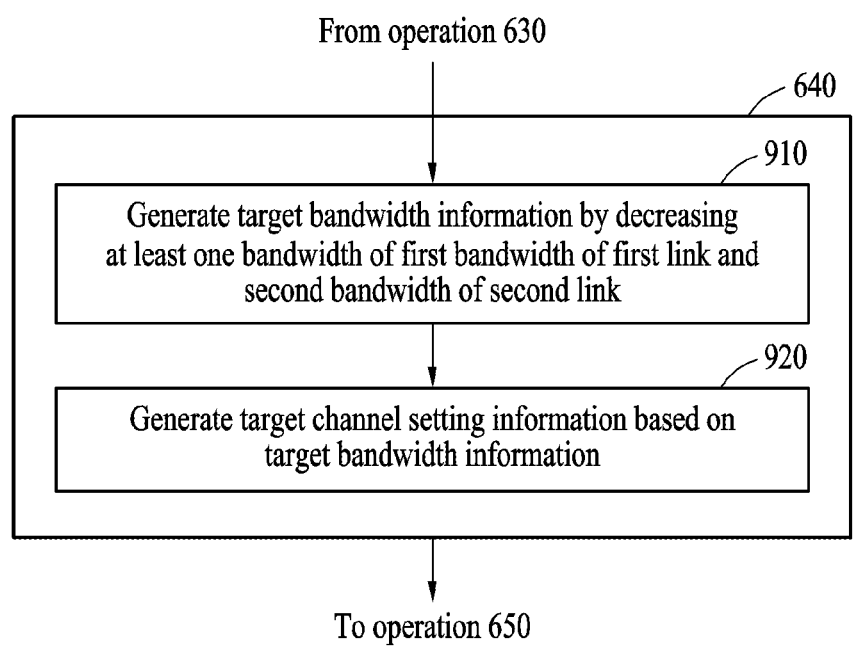
FIG. 9 is a flowchart illustrating an example method of generating target channel setting information based on a bandwidth of a link, according to an example embodiment.

FIG. 9 is a flowchart illustrating an example method of generating target channel setting information based on a bandwidth of a link, according to an example embodiment.

According to an example embodiment, operation 640 described above with reference to FIG. 6 may include operations 910 and 920 to be described below. Operations 910 and 920 may be performed by an electronic device (e.g., the electronic device 101 of FIG. 1, the electronic device 200 of FIG. 2, or the STA MLD 420 of FIG. 4).

In operation 910, a processor of the electronic device may generate target bandwidth information by decreasing at least one bandwidth of a first bandwidth of a first link and a second bandwidth of a second link. For example, the first bandwidth of the first link may include channels in a 5 GHz band and the second bandwidth of the second link may include channels in a 6 GHz band. When one or more upper channels in the first bandwidth or one or more lower channels in the second bandwidth are respectively excluded from the first link and the second link, a difference between a frequency band of the first link and a frequency band of the second link may increase by about a frequency band of the excluded channels. When the difference between the frequency band of the first link and the frequency band of the second link increases, a minimum frequency interval required between links may be satisfied.

According to an example embodiment, the electronic device may decrease at least one bandwidth of the first bandwidth of the first link and the second bandwidth of the second link, based on at least one of uplink data and downlink data. For example, the electronic device may decrease a bandwidth of links, based on at least one of a latency requirement and a throughput requirement of the uplink data and the downlink data. The latency and throughput requirements of data may vary depending on the type of application being executed in the electronic device. For example, when an application type requires a relatively low throughput but is sensitive to latency, the electronic device may decrease a bandwidth of links and use a first mode as far as possible. A method of decreasing the bandwidth of links is described in detail below with reference to FIG. 10.

In operation 920, the processor of the electronic device may generate target channel setting information based on the target bandwidth information. The target channel setting information may include the target bandwidth information. For example, the target channel setting information may further include default transmission power information and default MCS information. For example, the target channel setting information may further include target transmission power information changed from the default transmission power information and/or target MCS information changed from the default MCS information.

According to an example embodiment, a target minimum frequency interval determined based on the target channel setting information may be the same as a default minimum frequency interval determined based on the default channel setting information. However, when the difference between the frequency band of the first link and the frequency band of the second link is greater than the default minimum frequency interval, the first mode may be determined to be usable (e.g., operation 650).

Figure 10:
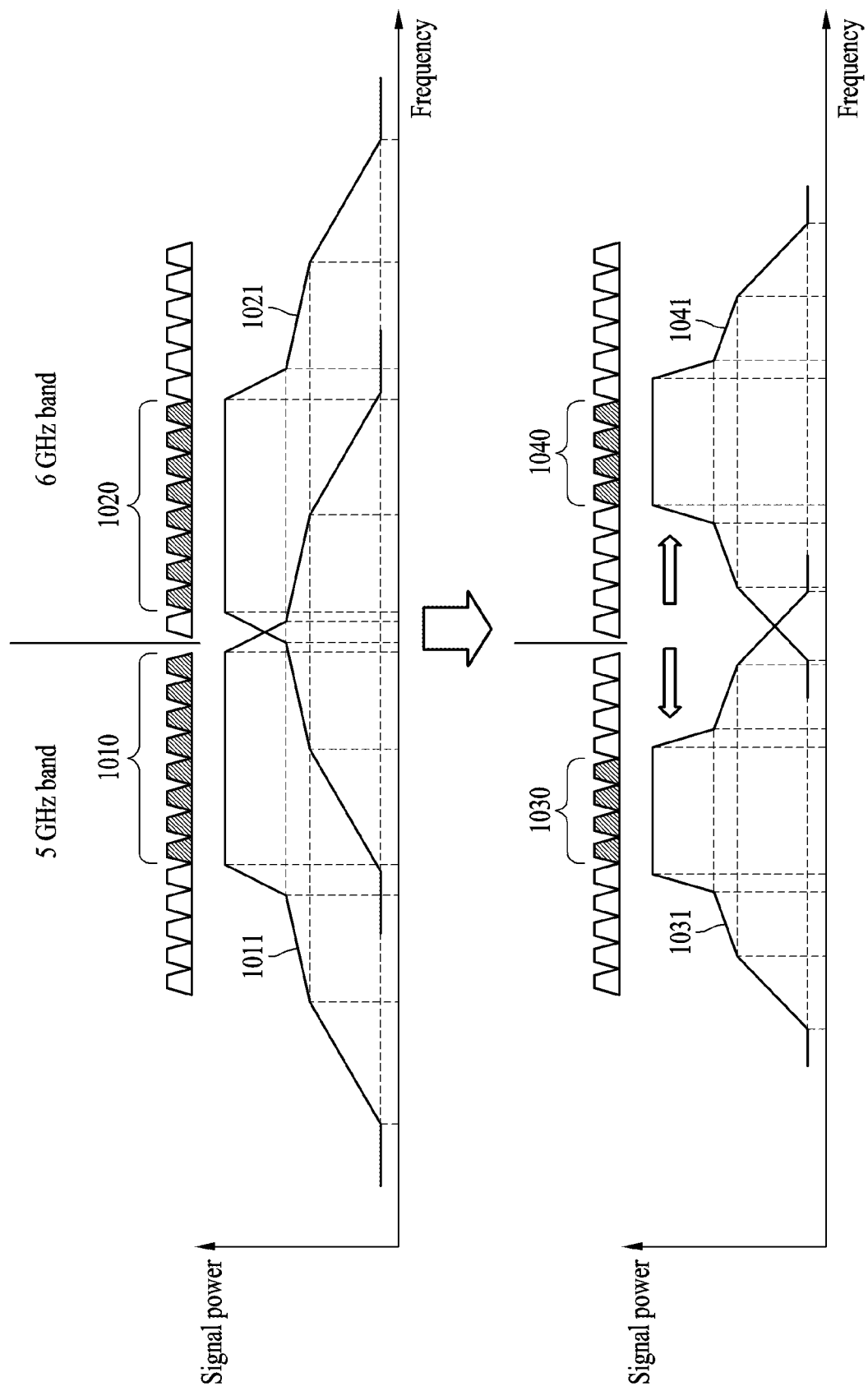
FIG. 10 is a diagram illustrating signal interference in a default bandwidth of links and a decreased bandwidth of the links, according to an example embodiment.

FIG. 10 is a diagram illustrating signal interference in a default bandwidth of links and a decreased bandwidth of the links, according to an example embodiment.

According to an example embodiment, a hub device (e.g., the first, second, and third hub devices 210, 220, and 230 of FIG. 2 or the AP MLD 410 of FIG. 4) may initially allocate first channels 1010 to a first link with an electronic device (e.g., the electronic device 101 of FIG. 1, the electronic device 200 of FIG. 2, or the STA MLD 420 of FIG. 4) and second channels 1020 to a second link. For example, the first channels 1010 may include channels 136, 140, 144, 149, 153, 157, 161, and 165 in a 5 GHz band and the second channels 1020 may include channels 5, 9, 13, 17, 21, 25, 29, and 33 in a 6 GHz band.

For example, the feature of a wireless signal transmitted through the first channels 1010 may be represented by a graph 1011 and the feature of a wireless signal transmitted through the second channels 1020 may be represented by a graph 1021. When a difference between the uppermost channel of the first channels 1010 and the lowermost channel of the second channels 1020 is less than a minimum frequency interval, the wireless signals may interfere with each other.

According to an example embodiment, the electronic device may exclude channels of at least one link of the first channels 1010 allocated to the first link and the second channels 1020 allocated to the second link. For example, the electronic device may allocate third channels 1030 to the first link by excluding four upper channels (e.g., channels 53, 157, 161, and 165) of the first channels 1010 of the first link and allocate fourth channels 1040 to the second link by excluding four lower channels (e.g., channels 5, 9, 13, and 17) of the second channels 1020 of the second link. For example, the third channels 1030 may include channels 136, 140, 144, and 149 in the 5 GHz band and the fourth channels 1040 may include channels 21, 25, 29, and 33 in the 6 GHz band.

For example, the feature of a wireless signal transmitted through the third channels 1030 may be represented by a graph 1031 and the feature of a wireless signal transmitted through the fourth channels 1040 may be represented by a graph 1041. When a difference between the uppermost channel of the third channels 1030 and the lowermost channel of the fourth channels 1040 is greater than the minimum frequency interval, the wireless signals may not interfere with each other.

In this case, since the number of channels allocated to the first link and the second link decreases, the overall throughput may decrease. In addition, the electronic device may operate in an STR mode, and the latency of transmitted and received data may decrease.

Although both the bandwidth of the first link and the bandwidth of the second link decrease in the example illustrated in FIG. 10, either the bandwidth of the first link or the bandwidth of the second link may decrease in another example. For example, when uplink data requires low latency and downlink data requires large throughput, the bandwidth of an uplink may decrease and the bandwidth of a downlink may not decrease. For example, the bandwidth of a link may be adjusted based on a higher priority requirement between a throughput requirement of data and a latency requirement of the data.

Figure 11:
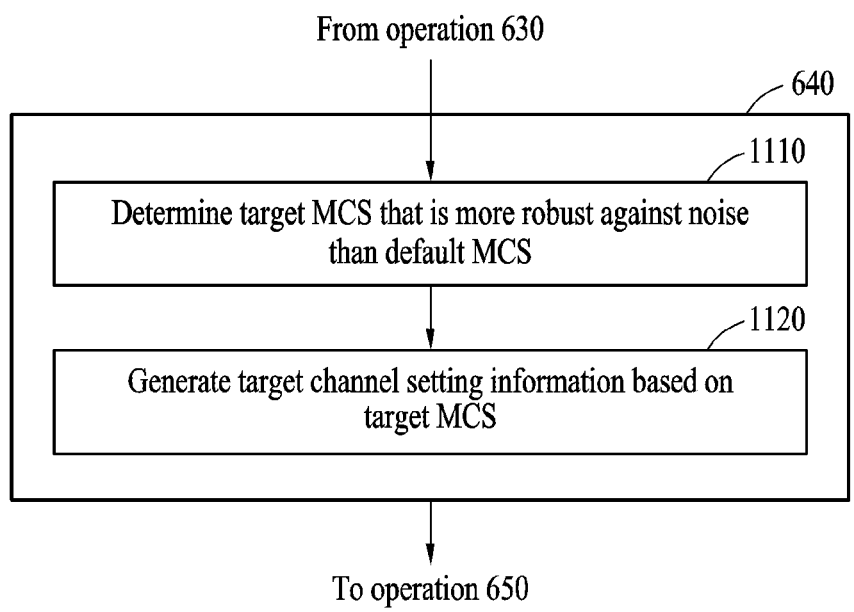
FIG. 11 is a flowchart illustrating an example method of generating target channel setting information based on a modulation and coding scheme (MCS), according to an example embodiment.

FIG. 11 is a flowchart illustrating an example method of generating target channel setting information based on an MCS, according to an example embodiment.

According to an example embodiment, operation 640 described above with reference to FIG. 6 may include operations 1110 and 1120 to be described below. Operations 1110 and 1120 may be performed by an electronic device (e.g., the electronic device 101 of FIG. 1, the electronic device 200 of FIG. 2, or the STA MLD 420 of FIG. 4).

In operation 1110, a processor of the electronic device may determine a target MCS that is more robust against noise than a default MCS. For example, a maximum value of the target MCS may be lower than a maximum value of the default MCS. For example, a throughput of the target MCS may be lower than a throughput of the default MCS.

According to an example embodiment, even in a network environment in which a first mode is not usable according to default channel setting information, an impact of interference between wireless signals may decrease when using the target MCS. For example, when changing from the default MCS to the target MCS, a minimum frequency interval between links may decrease.

According to an example embodiment, the electronic device may transmit information on an MCS through a supported EHT-MCS set field in a response frame to a management frame transmitted by a hub device in IEEE 802.11be or Wi-Fi 7. For example, in a process of associating with a hub device, the electronic device may transmit information, to the hub device through the supported EHT-MCS set field, on whether to use the MCS in a range of 0 to 9, further in a range of 10 to 11, or further in a range of 12 to 13. An example of the supported EHT-MCS set field is provided in Table 3 and Table 4.

TABLE 3

| Supported EHT-MCS set field | | | |
|---|---|---|---|
| EHT-MCS map (20 MHz-Only STA) | EHT-MCS map (BW ≤ 80 MHZ, Except 20 MHz-Only STA) | EHT-MCS map (BW = 160 MHz) | EHT-MCS map (BW = 320 MHz) |
| Octets: 0 or 4 | Octets: 0 or 3 | Octets: 0 or 3 | Octets: 0 or 3 |

TABLE 4

| EHT-MCS map (BW ≤ 80 MHz, Except 20 MHz-Only STA) | | | | | |
|---|---|---|---|---|---|
| B0 B3 Rx Max Nss That supports RHT-MCS 0-9 | B4 B7 Tx Max Nss That supports RHT-MCS 0-9 | B8 B11 Rx Max Nss That supports RHT-MCS 10-11 | B12 B15 Tx Max Nss That supports RHT-MCS 10-11 | B16 B19 Rx Max Nss That supports RHT-MCS 12-13 | B20 B23 Tx Max Nss That supports RHT-MCS 12-13 |
| Bits: 4 | Bits: 4 | Bits: 4 | Bits: 4 | Bits: 4 | Bits: 4 |

According to an example embodiment, the supported EHT-MCS set field may be transmitted to the hub device in an operation of associating the electronic device with the hub device before a plurality links is set. For example, when the electronic device is aware of frequency bands (e.g., a 5 GHz band and a 6 GHz band) that are covered by the hub device from the time of scanning and the degree of interference occurring when the hub device uses operation channels allocated to a first link and a second link, the electronic device may predetermine a range of the MCS based thereon.

According to an example embodiment, the electronic device may determine a noise level based on a reception intensity of the management frame and determine the target MCS based on the determined noise level.

In operation 1120, the processor of the electronic device may generate target channel setting information based on the target MCS. The target channel setting information may include target MCS information. For example, the target channel setting information may further include default transmission power information and default bandwidth information. For example, the target channel setting information may further include target transmission power information changed from the default transmission power information and/or target bandwidth information changed from the default bandwidth information.

According to an example embodiment, a target minimum frequency interval determined based on the target channel setting information may be less than a default minimum frequency interval determined based on the default channel setting information. For example, when a difference between a frequency band of the first link and a frequency band of the second link is greater than the minimum frequency interval, the electronic device may determine that a first mode is usable (e.g., operation 650).

According to an example embodiment, the electronic device may transmit information on a decreased minimum frequency interval to the hub device by displaying the information on the decreased minimum frequency interval on the frequency separation for STR of the MLD capabilities subfield of Table 1.

Figure 12:
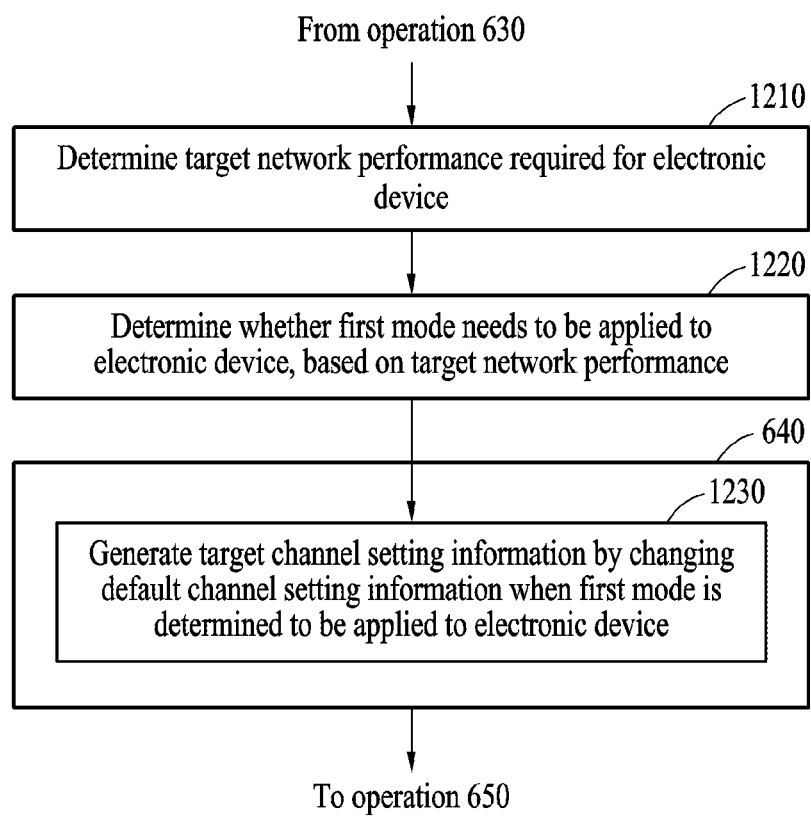
FIG. 12 is a flowchart illustrating an example method of determining an operation mode of an example electronic device, based on network performance required for the electronic device, according to an example embodiment.

FIG. 12 is a flowchart illustrating an example method of determining an operation mode of an electronic device, based on network performance required for the electronic device, according to an example embodiment.

According to an example embodiment, operations 1210 and 1220 to be described below may be further performed after operation 630 described above is performed. Operations 1210 and 1220 may be performed by an electronic device (e.g., the electronic device 101 of FIG. 1, the electronic device 200 of FIG. 2, or the STA MLD 420 of FIG. 4). According to an example embodiment, operation 640 described above with reference to FIG. 6 may include operation 1210 to be described below. Operation 1230 may be performed after operation 1220 is performed.

In operation 1210, a processor of the electronic device may determine target network performance required for the electronic device.

According to an example embodiment, the electronic device may determine the target network performance required for the electronic device, based on one or more applications currently being executed in the electronic device. For example, the target network performance may include a required degree of latency of data transmission and reception and a required degree of data throughput.

In operation 1220, the processor of the electronic device may determine whether a first mode (e.g., an STR mode) is applied to the electronic device, based on the target network performance.

According to an example embodiment, when low latency of data is required, using the STR mode may be more advantageous than using an NSTR mode for the electronic device. However, when low latency of data is not required, using the NSTR mode may be more advantageous than maintaining the STR mode while decreasing throughput.

For example, when a user of the electronic device makes a voice over internet protocol (VoIP) call, the quality of transmitted and received data may generally not be high. Therefore, maintaining a transmission speed at an average of about 10 megabits per second (Mbps) may not affect call quality, but a packet interval may be as short as 15-50 milliseconds (ms) for a seamless call. In this case, the electronic device operating in the STR mode may provide the user with better user experience than the electronic device operating in the NSTR mode even when the throughput of data decreases.

For example, when a large amount of data is downloaded in the background of the electronic device, the throughput of processing large data may be required more for the electronic device than the real-time performance of transmitting and receiving data. In this case, the electronic device may provide the user with better user experience when the electronic device operates in the NSTR mode rather than the STR mode by changing the default channel setting information.

According to an example embodiment, the electronic device may determine an operation mode to be a second mode (e.g., the NSTR mode) when the first mode does not need to be applied to the electronic device, based on the target network performance.

In operation 1230, the processor of the electronic device may generate target channel setting information by changing the default channel setting information when the first mode is determined to be applied to the electronic device. For example, default transmission power of the default channel setting information may be a first parameter, a default bandwidth of links may be a second parameter, and a default MCS value may be a third parameter. The electronic device may determine a combination of parameter values for allowing the electronic device to use the first mode by adjusting at least one of the first, second, and third parameters.

According to an example embodiment, the electronic device may determine that the first mode is usable when a difference between a frequency band of a first link and a frequency band of a second link is greater than a target minimum frequency interval determined based on the target channel setting information. For example, the electronic device may transmit information on a decreased minimum frequency interval to the hub device by displaying the information on the decreased minimum frequency interval on the frequency separation for STR of the MLD capabilities subfield of Table 1.

According to an example embodiment, the electronic device may determine the operation mode to be the second mode (e.g., the NSTR mode) when the difference between the frequency band of the first link and the frequency band of the second link is not greater than the target minimum frequency interval determined based on the target channel setting information.

According to an example embodiment, an electronic device (e.g., the electronic device 101 of FIG. 1, the electronic device 200 of FIG. 2, or the STA MLD 420 of FIG. 4) includes a communication module (e.g., the communication module 190 of FIG. 1) (e.g., including communication circuitry) configured to exchange data with an external device and at least one processor (e.g., the processor 120 of FIG. 1) (e.g., including processing circuitry) operatively connected to the communication module and configured to control the electronic device, in which the at least one processor is configured to receive a management frame transmitted by at least one hub device (e.g., the first, second, and third hub devices 210, 220, and 230 of FIG. 2 or the AP MLD 410 of FIG. 4) using the communication module (as in operation 610 of FIG. 6), determine default channel setting information on a plurality of links with the at least one hub device, based on the management frame (as in operation 620 of FIG. 6), determine whether a first mode (e.g., an STR mode) is usable, in which, in the first mode, data is transmitted to the at least one hub device through a first link based on the default channel setting information, and, at the same time, data is received from the at least one hub device through a second link (as in operation 630 of FIG. 6), when the first mode is determined to be not usable, generate first target channel setting information by changing the default channel setting information (as in operation 640 of FIG. 6), determine whether the first mode is usable based on the first target channel setting information (as in operation 650 of FIG. 6), and, when the first mode is determined to be usable based on the first target channel setting information, determine an operation mode of the plurality of links to be the first mode (as in operation 660 of FIG. 6).

The at least one processor may be configured to determine whether the first mode is usable by determining whether a frequency interval between the first link and the second link satisfies a default minimum frequency interval that is determined based on the default channel setting information.

The default channel setting information may include at least one of information on default transmission power of data exchanged between the electronic device and the at least one hub device, default bandwidth information on a first bandwidth of the first link and a second bandwidth of the second link, or information on a default MCS on data exchanged between the electronic device and the at least one hub device.

The at least one processor may be configured to determine target transmission power that is lower than the default transmission power to be transmission power of data and generate the first target channel setting information based on the target transmission power.

The at least one processor may be configured to determine the target transmission power based on a reception intensity of the management frame.

The at least one processor may be configured to determine whether the first mode is usable by determining whether a frequency interval between the first link and the second link satisfies a target minimum frequency interval determined based on the target transmission power.

The at least one processor may be configured to generate target bandwidth information by decreasing at least one bandwidth of the first bandwidth of the first link and the second bandwidth of the second link and generate the first target channel setting information based on the target bandwidth information.

The at least one processor may be configured to generate the target bandwidth information based on at least one of a latency requirement for transmission and reception of data and a throughput requirement for transmission and reception of data.

The latency requirement may be determined based on an application executed by the electronic device.

The at least one processor may be configured to determine whether the first mode is usable by determining whether a frequency interval between the first link and the second link satisfies a target minimum frequency interval determined based on target bandwidth power.

The at least one processor may be configured to determine a target MCS that is lower than the default MCS and generate the first target channel setting information based on the target MCS.

The at least one processor may be configured to determine the target MCS based on a reception intensity of the management frame.

The at least one processor may be configured to determine target network performance required for the electronic device, determine whether the first mode is applied to the electronic device based on the target network performance, and, when the first mode is determined to be applied to the electronic device, generate the first target channel setting information by changing the default channel setting information.

According to an example embodiment, a method performed by an electronic device (e.g., the electronic device 101 of FIG. 1, the electronic device 200 of FIG. 2, or the STA MLD 420 of FIG. 4) includes receiving a management frame transmitted by at least one hub device (e.g., the first, second, and third hub devices 210, 220, and 230 of FIG. 2 or the AP MLD 410 of FIG. 4) (as in operation 610 of FIG. 6), determining default channel setting information on a plurality of links with the at least one hub device, based on the management frame (as in operation 620 of FIG. 6), determining whether a first mode is usable, in which, in the first mode, data is transmitted to the at least one hub device through a first link based on the default channel setting information, and, at the same time, data is received from the at least one hub device through a second link (as in operation 630 of FIG. 6), when the first mode is determined to be not usable, generating first target channel setting information by changing the default channel setting information (as in operation 640 of FIG. 6), determining whether the first mode is usable based on the first target channel setting information (as in operation 650 of FIG. 6), and, when the first mode is determined to be usable based on the first target channel setting information, determining an operation mode of the plurality of links to be the first mode (as in operation 660 of FIG. 6).

The determining whether the first mode is usable based on the default channel setting information may include determining whether the first mode is usable by determining whether a frequency interval between the first link and the second link satisfies a default minimum frequency interval that is determined based on the default channel setting information.

The default channel setting information may include at least one of information on default transmission power of data exchanged between the electronic device and the at least one hub device, default bandwidth information on a first bandwidth of the first link and a second bandwidth of the second link, or information on a default MCS on data exchanged between the electronic device and the at least one hub device.

The method may further include determining target network performance required for the electronic device and determining whether the first mode is applied to the electronic device based on the target network performance, in which, when the first mode is determined to be not usable, the generating the first target channel setting information by changing the default channel setting information includes, when the first mode is determined to be applied to the electronic device based on the target network performance, generating the first target channel setting information by changing the default channel setting information.

According to an example embodiment, an electronic device (e.g., the electronic device 101 of FIG. 1, the electronic device 200 of FIG. 2, or the STA MLD 420 of FIG. 4) includes a communication module (e.g., the communication module 190 of FIG. 1) (e.g., including communication circuitry) configured to exchange data with an external device and at least one processor (e.g., the processor 120 of FIG. 1) (e.g., including processing circuitry) operatively connected to the communication module and configured to control the electronic device, in which the at least one processor is configured to receive a management frame transmitted by at least one hub device (e.g., the first, second, and third hub devices 210, 220, and 230 of FIG. 2 or the AP MLD 410 of FIG. 4) using the communication module (as in operation 610 of FIG. 6), determine default channel setting information on a plurality of links with the at least one hub device, based on the management frame (as in operation 620 of FIG. 6), determine whether an STR mode is usable, in which, in the STR mode, data is transmitted to the at least one hub device through a first link based on the default channel setting information, and, at the same time, data is received from the at least one hub device through a second link (as in operation 630 of FIG. 6), when the STR mode is determined to be not usable, generate first target channel setting information by changing the default channel setting information (as in operation 640 of FIG. 6), and determine an operation mode of the plurality of links to be the STR mode or an NSTR mode, based on the first target channel setting information (as in operations 660 and 670 of FIG. 6).

The at least one processor may be configured to determine whether the STR mode is usable by determining whether a frequency interval between the first link and the second link satisfies a default minimum frequency interval that is determined based on the default channel setting information.

The at least one processor may be configured to determine whether the STR mode is usable based on the first target channel setting information, when the STR mode is determined to be not usable, generate second target channel setting information by changing the first target channel setting information, and determine the operation mode of the plurality of links to be the STR mode or the NSTR mode, based on the second target channel setting information.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
 a communication module, including communication circuitry, configured to exchange data with an external device; and
 at least one processor operatively connected to the communication module and configured to control the electronic device, wherein
 the at least one processor is configured to:
  receive a management frame transmitted by at least one hub device, using the communication module,
  determine default channel setting information on a plurality of links with the at least one hub device, based on the management frame,
  determine whether a first mode is usable, wherein, in the first mode, data is transmitted to the at least one hub device through a first link based on the default channel setting information, and, at the same time, data is received from the at least one hub device through a second link,
  when the first mode is determined to be not usable, generate first target channel setting information by changing the default channel setting information, determine whether the first mode is usable based on the first target channel setting information, and when the first mode is determined to be usable based on the first target channel setting information, determine an operation mode of the plurality of links to be the first mode.

2. The electronic device of claim 1, wherein the at least one processor is further configured to:
   determine whether the first mode is usable by determining whether a frequency interval between the first link and the second link satisfies a default minimum frequency interval that is determined based on the default channel setting information.

3. The electronic device of claim 1, wherein the default channel setting information comprises at least one of:
   information on default transmission power of data exchanged between the electronic device and the at least one hub device,
   default bandwidth information on a first bandwidth of the first link and a second bandwidth of the second link, or
   information on a default modulation and coding scheme (MCS) on data exchanged between the electronic device and the at least one hub device.

4. The electronic device of claim 3, wherein the at least one processor is further configured to:
   determine target transmission power that is lower than the default transmission power to be transmission power of data, and
   generate the first target channel setting information based on the target transmission power.

5. The electronic device of claim 4, wherein the at least one processor is further configured to determine the target transmission power based on a reception intensity of the management frame.

6. The electronic device of claim 4, wherein the at least one processor is further configured to determine whether the first mode is usable by determining whether a frequency interval between the first link and the second link satisfies a target minimum frequency interval determined based on the target transmission power.

7. The electronic device of claim 3, wherein the at least one processor is further configured to:
   generate target bandwidth information by decreasing at least one bandwidth of the first bandwidth of the first link and the second bandwidth of the second link, and
   generate the first target channel setting information based on the target bandwidth information.

8. The electronic device of claim 7, wherein the at least one processor is further configured to generate the target bandwidth information based on at least one of a latency requirement for transmission and reception of data or a throughput requirement for transmission and reception of data.

9. The electronic device of claim 8, wherein the latency requirement is determined based on an application executed by the electronic device.

10. The electronic device of claim 7, wherein the at least one processor is further configured to determine whether the first mode is usable by determining whether a frequency interval between the first link and the second link satisfies a target minimum frequency interval determined based on target bandwidth power.

11. The electronic device of claim 3, wherein the at least one processor is further configured to determine a target MCS that is lower than the default MCS and generate the first target channel setting information based on the target MCS.

12. The electronic device of claim 11, wherein the at least one processor is further configured to determine the target MCS based on a reception intensity of the management frame.

13. The electronic device of claim 1, wherein the at least one processor is further configured to:
    determine target network performance required for the electronic device,
    determine whether the first mode is applied to the electronic device based on the target network performance, and
    when the first mode is determined to be applied to the electronic device, generate the first target channel setting information by changing the default channel setting information.

14. A method performed by an electronic device, the method comprising:
    receiving a management frame transmitted by at least one hub device;
    determining default channel setting information on a plurality of links with the at least one hub device, based on the management frame;
    determining whether a first mode is usable, wherein, in the first mode, data is transmitted to the at least one hub device through a first link based on the default channel setting information, and at the same time, data is received from the at least one hub device through a second link;
    when the first mode is determined to be not usable, generating first target channel setting information by changing the default channel setting information;
    determining whether the first mode is usable based on the first target channel setting information; and
    when the first mode is determined to be usable based on the first target channel setting information, determining an operation mode of the plurality of links to be the first mode.

15. The method of claim 14, wherein the determining whether the first mode is usable based on the default channel setting information comprises:
    determining whether the first mode is usable by determining whether a frequency interval between the first link and the second link satisfies a default minimum frequency interval that is determined based on the default channel setting information.

16. The method of claim 14, wherein the default channel setting information comprises at least one of:
    information on default transmission power of data exchanged between the electronic device and the at least one hub device,
    default bandwidth information on a first bandwidth of the first link and a second bandwidth of the second link, or
    information on a default modulation and coding scheme (MCS) on data exchanged between the electronic device and the at least one hub device.

17. The method of claim 14, further comprising:
    determining target network performance required for the electronic device; and determining whether the first mode is applied to the electronic device based on the target network performance, wherein when the first mode is determined to be not usable, the generating the first target channel setting information by changing the default channel setting information comprises:

when the first mode is determined to be applied to the electronic device based on the target network performance, generating the first target channel setting information by changing the default channel setting information.

18. An electronic device comprising:

a communication module, including communication circuitry, configured to exchange data with an external device; and at least one processor operatively connected to the communication module and configured to control the electronic device, wherein the at least one processor is configured to:

receive a management frame transmitted by at least one hub device, using the communication module, determine default channel setting information on a plurality of links with the at least one hub device, based on the management frame, determine whether a simultaneous transmission and reception (STR) mode is usable, wherein, in the STR mode, data is transmitted to the at least one hub device through a first link based on the default channel setting information, and, at the same time, data is received from the at least one hub device through a second link, when the STR mode is determined to be not usable, generate first target channel setting information by changing the default channel setting information, and determine an operation mode of the plurality of links to be the STR mode or a non-simultaneous transmission and reception (NSTR) mode, based on the first target channel setting information.

19. The electronic device of claim 18, wherein
the at least one processor is further configured to:
determine whether the STR mode is usable by determining whether a frequency interval between the first link and the second link satisfies a default minimum frequency interval that is determined based on the default channel setting information.

20. The electronic device of claim 18, wherein
the at least one processor is further configured to:
determine whether the STR mode is usable based on the first target channel setting information,
when the STR mode is determined to be not usable, generate second target channel setting information by changing the first target channel setting information, and
determine the operation mode of the plurality of links to be the STR mode or the NSTR mode, based on the second target channel setting information.

* * * * *